United States Patent [19]

Takeda

[11] Patent Number: 4,480,616
[45] Date of Patent: Nov. 6, 1984

[54] KNOCK CONTROL METHOD AND APPARATUS FOR AN INTERNAL-COMBUSTION ENGINE

[75] Inventor: Keiso Takeda, Susono, Japan

[73] Assignee: Toyota Jidosha Kabushiki Kaisha, Toyota, Japan

[21] Appl. No.: 460,987

[22] Filed: Jan. 25, 1983

[30] Foreign Application Priority Data

Jan. 26, 1982 [JP] Japan .................. 57-9465

[51] Int. Cl.³ .............................................. F02P 5/14
[52] U.S. Cl. .................................. 123/425; 123/25 R; 123/25 J; 123/198 A
[58] Field of Search ................... 123/42 J, 25 R, 25 J, 123/198 A, 198 E

[56] References Cited

U.S. PATENT DOCUMENTS

| | | | |
|---|---|---|---|
| 1,528,665 | 3/1925 | Fischer | 123/25 J |
| 2,252,416 | 8/1941 | Schwarz | 123/198 A |
| 2,401,563 | 6/1946 | Hersey | 123/198 E |
| 2,407,652 | 9/1946 | Costa | 123/198 E |
| 2,595,524 | 5/1952 | Hennaman et al. | 123/198 A |
| 4,231,333 | 11/1980 | Thadeher et al. | 123/25 R |
| 4,364,370 | 12/1982 | Smith et al. | 123/198 A |
| 4,370,964 | 2/1983 | Muranaka et al. | 123/425 |
| 4,375,668 | 3/1983 | Leung et al. | 123/425 |
| 4,406,255 | 9/1983 | Goodman | 123/198 A |
| 4,413,599 | 11/1983 | Shigematsu et al. | 123/425 |

FOREIGN PATENT DOCUMENTS

| | | | |
|---|---|---|---|
| 0206746 | 12/1982 | Japan | 123/425 |
| 2099918 | 4/1982 | United Kingdom | 123/425 |

Primary Examiner—Raymond A. Nelli
Attorney, Agent, or Firm—Finnegan, Henderson, Farabow, Garrett & Dunner

[57] ABSTRACT

When the operating condition of an engine is in a predetermined knock-development range, an antiknock agent is supplied to the engine. The ignition timing of the engine is advanced after a predetermined time has elapsed subsequent to the start of supplying the antiknock agent.

15 Claims, 9 Drawing Figures

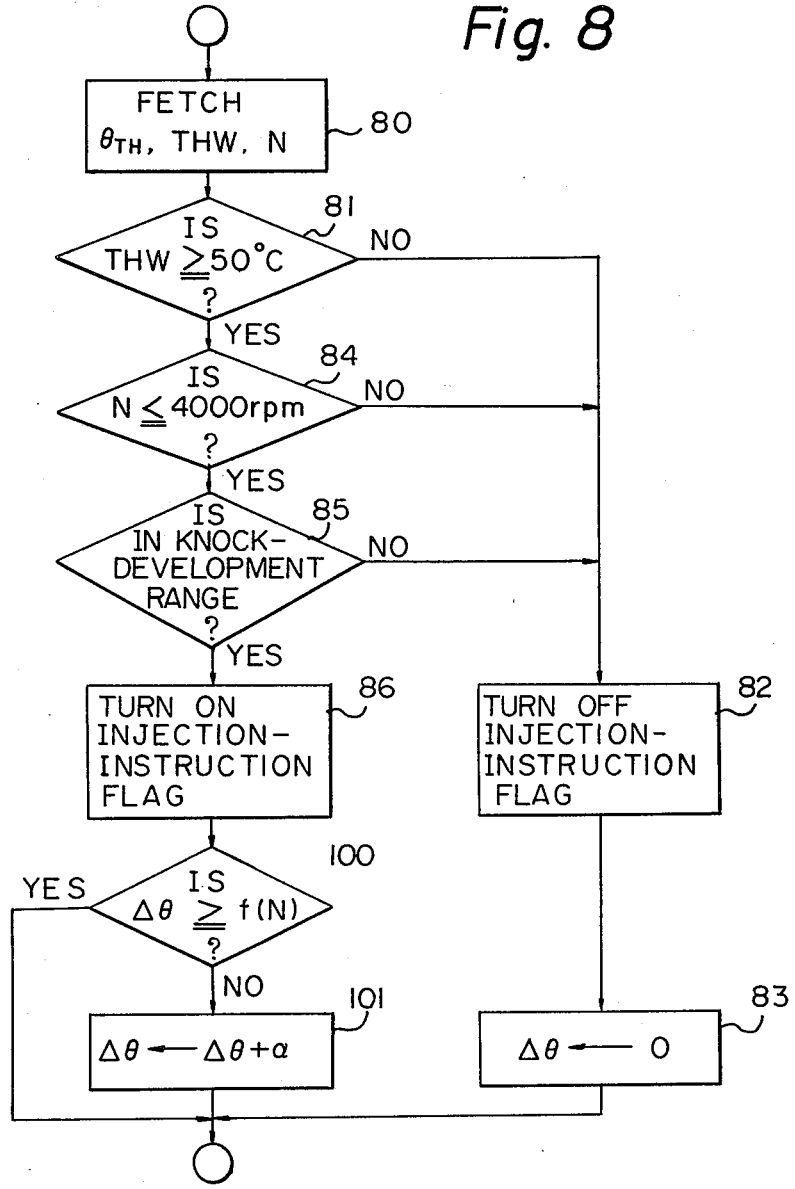

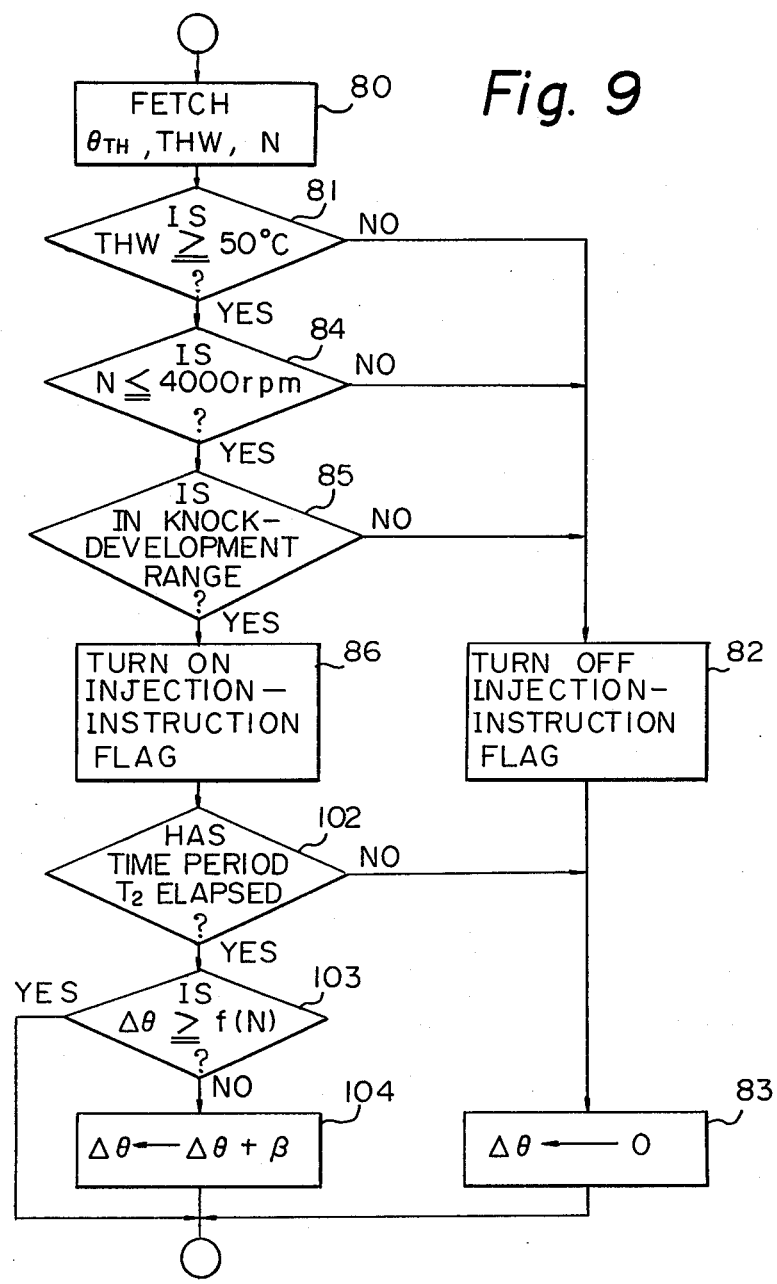

KNOCK CONTROL METHOD AND APPARATUS FOR AN INTERNAL-COMBUSTION ENGINE

BACKGROUND OF THE INVENTION

The present invention relates to a knock control method and apparatus for suppressing knocking and for increasing the torque of an internal-combustion engine.

When the compression ratio is high, the engine has a greater tendency to knock than when the compression ratio is low. Particularly, when the engine is running at a low or medium rotational speed and the throttle valve is almost wide open, the above-mentioned tendency of the engine to knock increases.

Therefore, it is necessary to suppress knocking in engines with a high compression ratio and in turbocharged engines under the above-mentioned engine operating condition. One conventional method for suppressing knocking in such engines is to supply an antiknock agent such as water or alcohol to an engine operating in a knock-development condition, i.e., in a condition wherein the engine has a great tendency to knock. At the same time, the ignition timing of the engine is advanced to Minimum advance for the Best Torque (MBT) so as to improve the torque characteristics thereof.

In this conventional method, however, since the ignition timing is advanced to MBT simultaneous with supply of the antiknock agent, there is a delay in the supply and transmission of the antiknock agent. This delay causes very loud knocks for several cycles of the engine operation.

SUMMARY OF THE INVENTION

It is, therefore, an object of the present invention to provide a knock control method and apparatus whereby knocking when an antiknock agent is supplied and when the ignition timing is advanced can be prevented.

To achieve the objects and in accordance with the purpose of the invention, as embodied and broadly described herein, the knock control method for an internal-combustion engine, according to the present invention, comprises the steps of: detecting the operating condition of the engine to produce at least one engine parameter signal which indicates the detected operating condition; in response to the engine parameter signal, discriminating whether or not the operating condition of the engine is in a predetermined knock-development condition wherein the engine has a greater tendency to knock; if it is discriminated that the operating condition of the engine is in the predetermined knock-development condition supplying an antiknock agent to the engine; and after supplying the antiknock agent to the engine, advancing the ignition timing a predetermined time after the start of supplying the antiknock agent.

Furthermore, the knock control apparatus for an internal-combustion engine, according to the present invention, comprises: means for detecting the operating condition of the engine to produce at least one engine parameter signal which is indicative of the detected operating condition; means responsive to said engine parameter signal for discriminating whether or not the operating condition of the engine is in a predetermined knock-development range wherein the engine has a greater tendency to knock; means for supplying an antiknock agent to the engine if it is discriminated that the operating condition of the engine is in the predetermined knock-development range; and means for advancing the ignition timing a predetermined time after the start of supplying the antiknock agent.

The above and other related objects and features of the present invention will be apparent from the description of the present invention set forth below, with reference to the accompanying drawings, as well as from the appended claims.

BRIEF DESCRIPTION OF THE DRAWINGS

FIGS. 8 and 9 are, respectively, flow diagrams illustrating modifications of the program of FIG. 3.

DETAILED DESCRIPTION OF THE PREFERRED EMBODIMENTS

Figure 1:
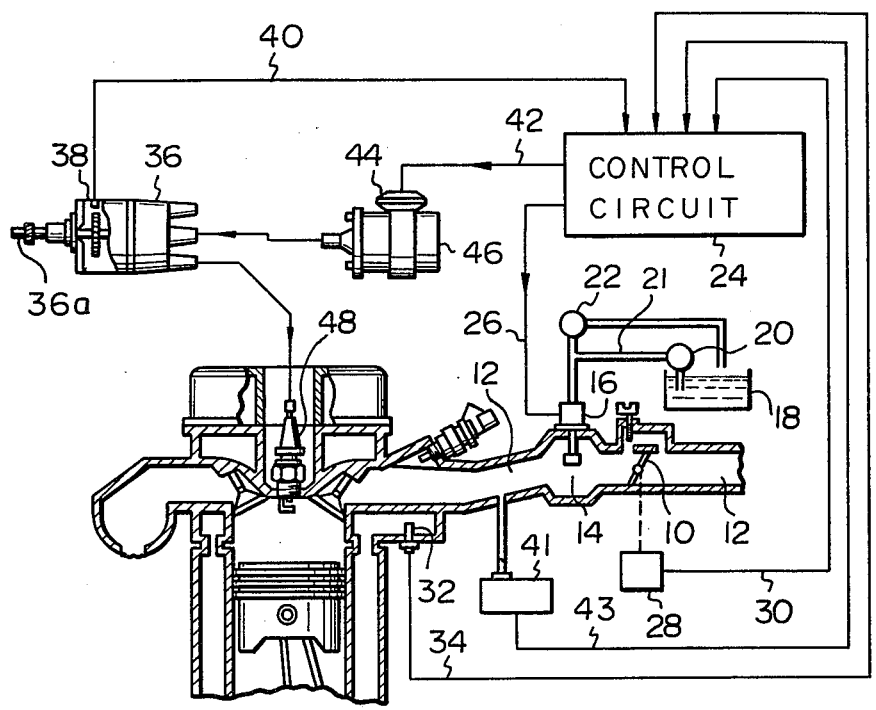
FIG. 1 is a schematic diagram illustrating a knock control system constructed according to the present invention.

Referring to FIG. 1, the figure illustrates an example of a knock control system for an internal-combustion engine for suppressing knocking and for improving the torque characteristics of the engine by advancing the ignition timing. In FIG. 1, reference numeral 10 denotes a throttle valve disposed in an intake passage 12 of the engine. An electromagnetic antiknock injector 16 is mounted on a surge tank 14 located downstream of the throttle valve 10. The antiknock agent, for example, water, alcohol, or a water-alcohol mixture, contained in a tank 18 is pressured with a pump 20 and is fed to the antiknock injector 16 via a conduit 21. In order to maintain the pressure of the antiknock agent, a pressure adjustment valve 22 is provided. The antiknock injector 16 either continuously or intermittently injects the pressured antiknock agent into the surge tank 14 when a predetermined injection signal is sent thereto from a control circuit 24 via a line 26.

A throttle position sensor 28, which generates a voltage corresponding to the opening degree of the throttle valve 10, is attached to a rotary shaft of the throttle valve 10. The voltage generated by the throttle position sensor 28 is sent to the control circuit 24 via a line 30.

A coolant temperature sensor 32, which generates a voltage corresponding to the coolant temperature, is attached to the cylinder block of the engine. The voltage generated by the coolant temperature sensor 32 is sent to the control circuit 24 via a line 34.

An ignition distributor 36 is equipped with a crank angle sensor 38 which generates an angular position signal each time the distributor shaft 36a rotates a predetermined angle, i.e., 30° in terms of the crank angle. The angular position signals generated by the crank angle sensor 38 are sent to the control circuit 24 via a line 40.

A pneumatic pressure sensor 41, which generates a voltage corresponding to the pneumatic pressure in the intake manifold, is communicated with the intake passage 12 at a position downstream of the throttle valve 10. The voltage generated by the pneumatic pressure sensor 41 is sent to the control circuit 24 via a line 43.

The control circuit 24 sends an ignition signal to an igniter 44, which permits, as well as interrupts, the flow of a primary current to an ignition coil 46. A high-voltage secondary current produced by the ignition coil 46 is sent to spark plugs 48 via the distributor 36.

Figure 2:
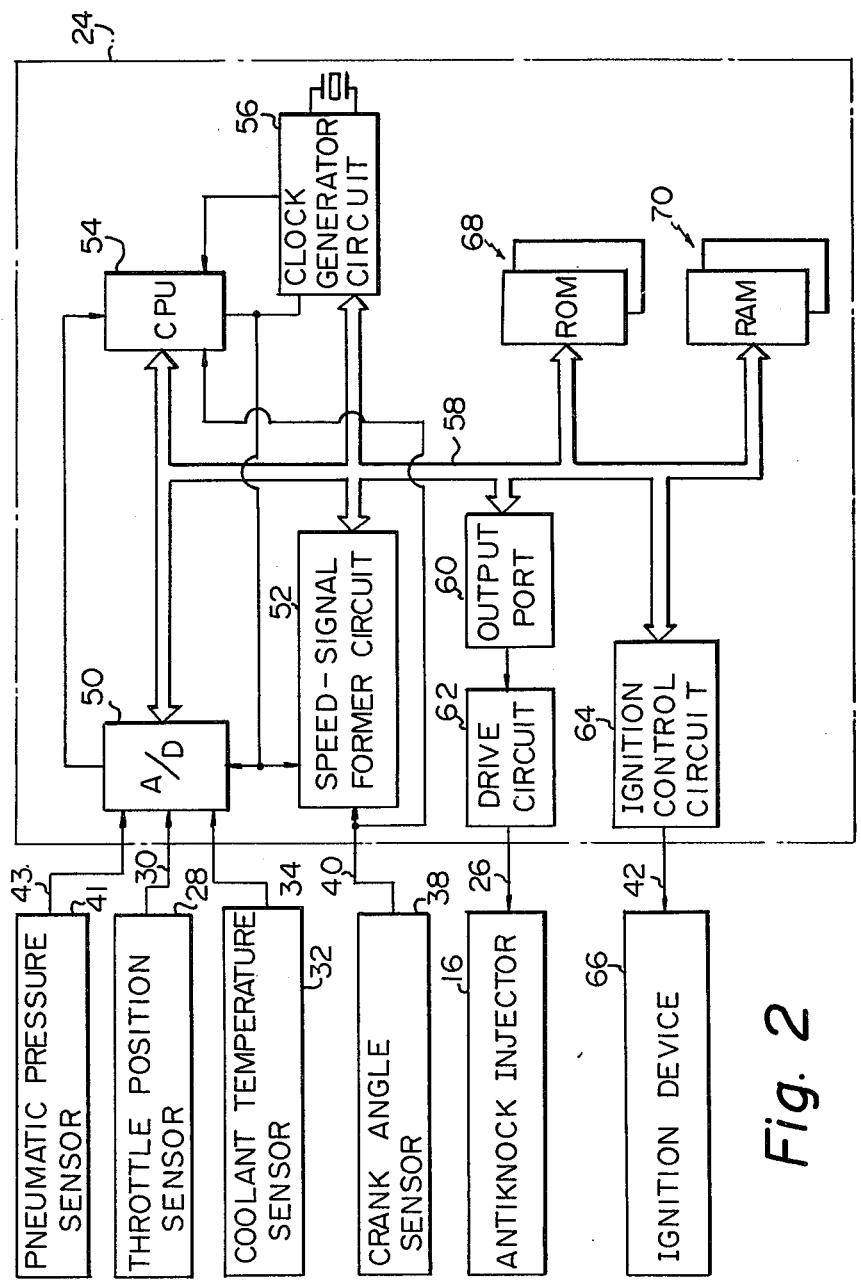
FIG. 2 is a block diagram illustrating a control circuit in the knock control system of FIG. 1.

FIG. 2 is block diagram illustrating an example of the control circuit 24 of FIG. 1. In the figure, the output voltages of the throttle position sensor 28, the coolant temperature sensor 32, and the pneumatic pressure sensor 41 are sent to an A/D converter 50 functioning as both an analog multiplexer and a converter and are converted in sequence into binary signals at predetermined conversion intervals.

The angular position signal generated by the crank angle sensor 38 each time the distributor shaft 36a rotates 30° in terms of the crank angle is sent to a speed-signal former circuit 52 and to a central processing unit (CPU) 54 as a crank-angle interruption signal. The speed-signal former circuit 52 has a gate that is opened and closed in accordance with the angular position signal generated each time the distributor shaft 36a rotates 30° in terms of the crank angle and a counter which counts the number of clock pulses sent from a clock generator circuit 56 and passing through the gate each time the gate is opened. Thus, the speed-signal former circuit 52 forms a binary speed signal having a value corresponding to the rotational speed of the engine.

When an injection signal of, for example, "1" is transmitted from the CPU 54 to a predetermined bit position of an output port 60 via a bus 58, a drive circuit 62 generates injection pulses having a fired duty ratio or an injection signal having a predetermined current. The injection pulses or the injection signal is sent to the antiknock injector 16 via the line 26, with the result that the antiknock injector 16 injects a predetermined amount of the antiknock agent into the surge tank 14 irrespective of the operating condition of the engine.

The ignition control circuit 64 is equipped with two registers, two down counters, and a flip-flop circuit. One of the two registers receives output data related to the time when a current starts to flow in the ignition coil 46, which output data is calculated by the CPU 54. The other register receives output data related to the time when the current stops flowing in the ignition coil 46, i.e., output data related to the ignition timing. The two down counters generate pulses at times determined by the output data. The flip-flow circuit is set and reset by the pulses from the down counters and generates an ignition signal which represents the period of time necessary for transmitting the current to the ignition coil. This type of ignition control circuit is widely known. In such a circuit, the ignition signal is sent to an ignition device 66, which consists of spark plugs 48, the distributor 36, and the ignition coil 46 shown in FIG. 1.

The A/D converter 50, the speed-signal former circuit 52, the output port 60, and the ignition control circuit 64 are connected to the CPU 54, a read-only memory (ROM) 68, a random access memory (RAM) 70, and the clock generator circuit 56 via the bus 58.

Although it is not diagrammatized in FIG. 2, the microcomputer of the present invention is further equipped with an input/output control circuit, a memory control circuit, and the like in a customary manner.

In the ROM 68, there is stored beforehand a program for the main processing routine, an interrupt processing program for calculating the ignition timing, and other processing programs, as well as various kinds of data necessary for performing calculation, as will be explained later.

Below is illustrated the operation processed by the aforementioned microcomputer.

Figure 3:
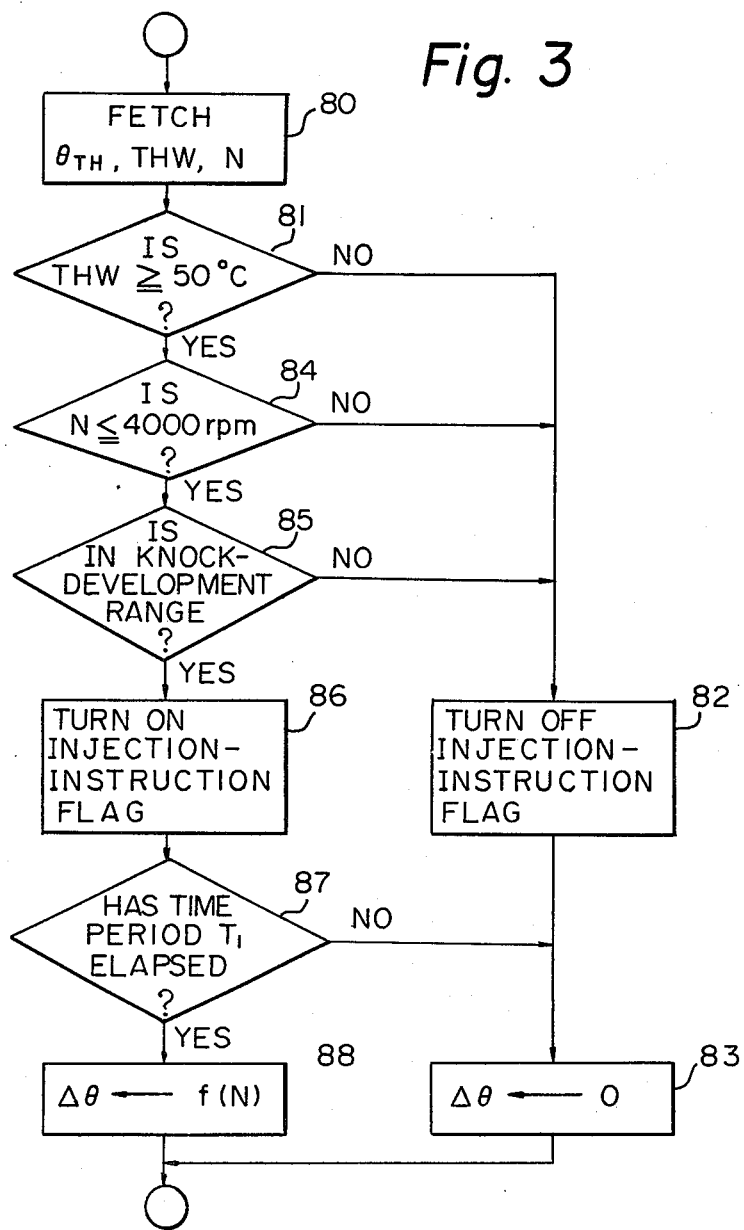
FIG. 3 is the flow diagram illustrating part of a program of the microcomputer in the control circuit of FIG. 2.

In the main processing routine, the CPU 54 executes the processing shown in FIG. 3. First, at point 80, the CPU 54 fetches detected data related to the throttle opening degree $\theta_{TH}$ and to the coolant temperature THW from the RAM 70. This detected data is converted beforehand from analog data to digital data by the A/D converter 50 and it is stored in a predetermined region of the RAM 70. Furthermore, at point 80, the CPU 54 fetches data corresponding to the rotational speed N from the RAM 70. The rotational speed N data is sent beforehand from the speed-signal former circuit 52 to the CPU 54 and is stored in a predetermined region of the RAM 70.

At point 81, the CPU 54 discriminates or determines whether the coolant temperature THW is equal to or greater than 50° C. (THW≧50° C.). If it is THW<50° C., the program proceeds to point 82, where an injection-instruction flag with respect to the antiknock agent is turned off ("0"). When the injection-instruction flag is off, no injection signal or injection pulses are output to the output port 60 and thus the antiknock agent is not injected. At point 83, the amount of correction $\Delta\theta$ of the spark advance angle is reset at zero ($\Delta\theta \leftarrow 0$). Accordingly, correction of the spark advance angle for additionally advancing the spark advance angle is not carried out so as to keep the ignition timing at a timing corresponding to the basic spark advance angle.

If THW≧50° C., the program proceeds to point 84, where it is discriminated whether or not the rotational speed N is N≦4000 rpm. If "NO" (N>4000 rpm), the program proceeds to point 82, and if "YES" (N≦4000 rpm), the program proceeds to point 85. At point 85, the CPU 54 discriminates whether or not the present operating condition of the engine, defined by the rotational speed N and the throttle opening degree $\theta_{TH}$, is in a predetermined knock-development range by using a map in the ROM 68. If the operating condition of the engine is in a range corresponding to the upper side (heavy load side) of the solid line a in FIG. 4, the CPU 54 discriminates that the operating condition of the engine is in a knock-development range (antiknock-injection range) and executes the step of point 86. Namely, the injection-instruction flag is turned on ("1") at point 86. If the operating condition of the engine is in a range corresponding to the shaded portion of FIG. 4, the program proceeds to point 82.

Figure 4:
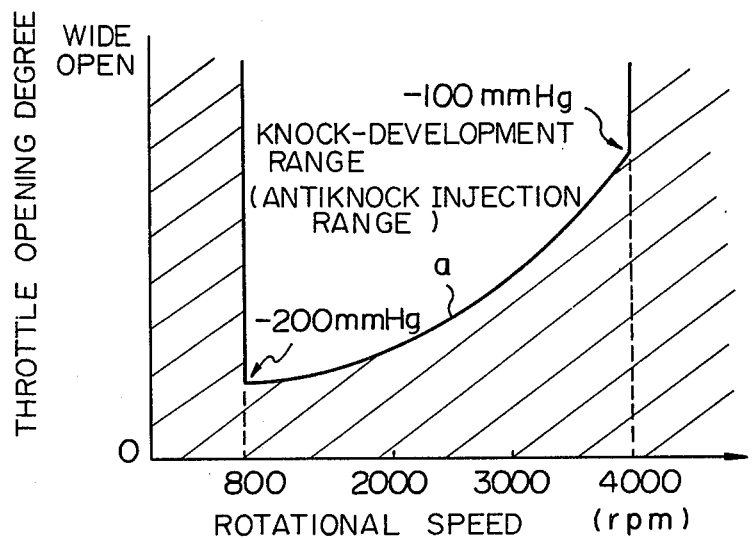
FIG. 4 is a graph illustrating a knock-development range.

As was mentioned above, the injection-instruction flag is turned on only when the coolant temperature THW is THW≧50° C., the rotational speed N is N≦4000 rpm, and the operating condition of the engine is in a range corresponding to the upper side of the solid line a in FIG. 4. When the injection-instruction flag is on, the injection-instruction signal is output to the output port 60, causing the antiknock agent to be supplied to the engine.

Figure 5:
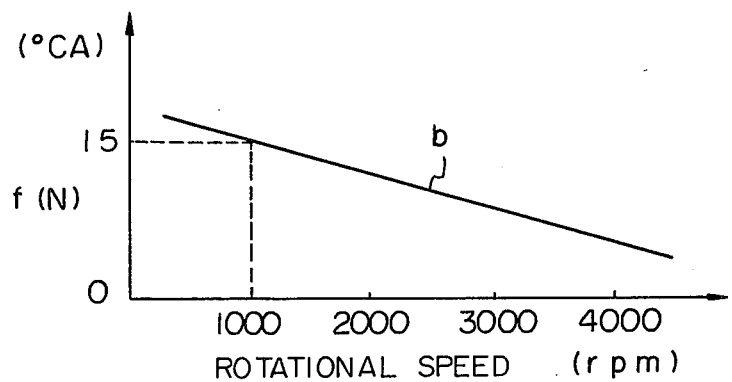
FIG. 5 is a graph illustrating the relationship between the amount of correction f(N) of the spark advance angle and the rotational speed N.

From point 86, the program proceeds to point 87, where it is discriminated whether or not a predetermined time period $T_1$ has elapsed since turning on of the injection-instruction flag. If the predetermined time period $T_1$ has not elapsed, the program proceeds to point 83, where the amount of correction $\Delta\theta$ is reset at zero so that the spark advance angle is not corrected. If the predetermined time period $T_1$ has elapsed, the program proceeds to point 88, where the amount of correction $\Delta\theta$ is determined to be f(N) ($\Delta\theta \leftarrow$ f(N)). This f(N) is a value necessary for advancing the ignition timing from the basic spark advance angle $\theta_{OPT}$ to MBT. It is desirable that the value f(N) be varied depending upon the rotational speed N, which variation is shown by the solid line b in FIG. 5.

Figure 6:
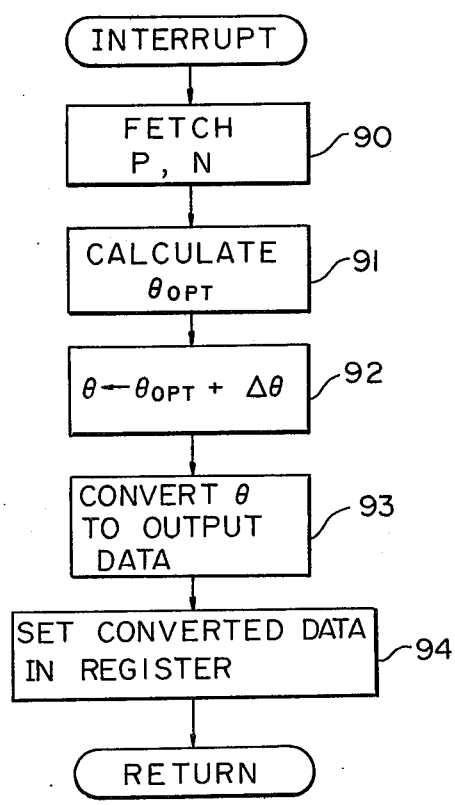
FIG. 6 is a second flow diagram illustrating part of the program of the microcomputer in the control circuit of FIG. 2.

The CPU 54 executes the processing routine illustrated in FIG. 6 to calculate the ignition timing at each predetermined crank angle. First, at point 90, the CPU 54 fetches detected data corresponding to the pneumatic pressure P in the intake manifold and to the rotational speed N from the RAM 70. Then at point 91, the CPU 54 calculates the basic spark advance angle $\theta_{OPT}$ from the detected data corresponding to P and N. The basic spark advance angle $\theta_{OPT}$ can be calculated by means of a variety of widely known methods. For instance, the basic spark advance angle $\theta_{OPT}$ can be calculated from a map stored in the ROM 68, which map indicates a predetermined relationship between the basic spark advance angle $\theta_{OPT}$, the rotational speed N, and the intake manifold pneumatic pressure P. The CPU 54 then, at point 92, corrects the calculated spark advance angle $\theta_{OPT}$ depending upon the amount of correction $\Delta\theta$. Namely, at point 92, the calculation $\theta \leftarrow \theta_{OPT} + \Delta\theta$ for advancing the ignition timing by $\Delta\theta$ is performed. At point 93, the CPU 54 calculates the crank angle between an ignition timing angle corresponding to the finally calculated spark advance angle $\theta_{OPT}$ and a reference angle, next calculates the time required by the crank shaft to make the calculated crank angle, and finally converts the calculated value into a count number of one of the down counter in the ignition control circuit 64. The converted ignition timing data is set, at point 94, in one of the registers in the ignition control circuit 64. Thus, the ignition timing is controlled to a timing corresponding to $\theta_{OPT} + \Delta\theta$. The CPU 54 calculates, in a customary manner, data corresponding to the time when the current starts to flow in the ignition coil based upon the above-calculated ignition timing data, and sends the calculated data to another register in the ignition control circuit 64.

Figure 7:
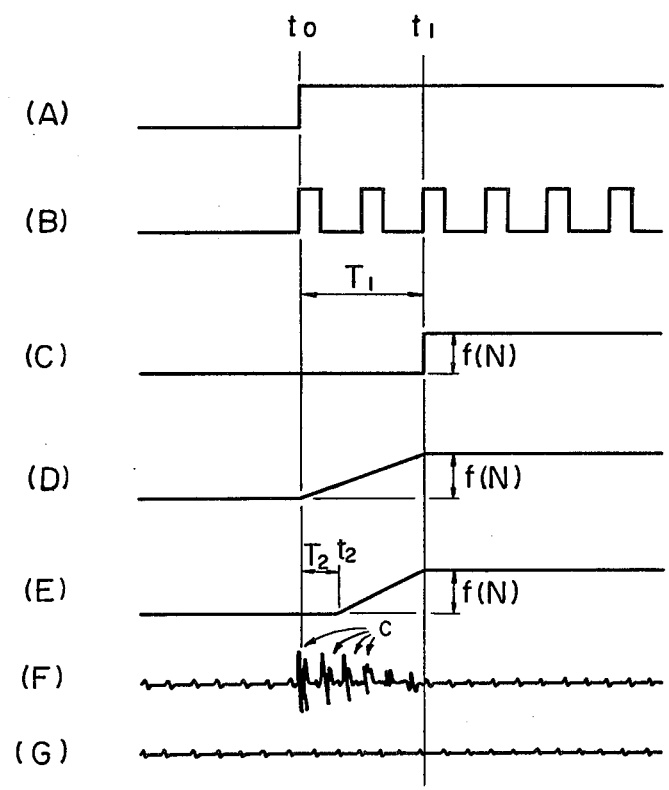
FIG. 7 is a time chart illustrating the operation and effect of the present invention.

FIG. 7 illustrates the operations and effects of the aforementioned embodiment of FIG. 3 and the embodiments of FIGS. 8 and 9.

If the operating condition of the engine enters the knock-development range at the time $t_0$, the antiknock agent is continuously (FIG. 7A) or intermittently (FIG. 7B) injected in to the engine by the antiknock injector 16. According to a conventional knock control technique, since the ignition timing is advanced to MBT at the time $t_0$, namely, simultaneous with the start of injection of the antiknock agent, very loud knocks c occur, as is shown in FIG. 7(F). The knocks occur because, although the ignition timing is electrically controlled and thus changes instantaneously, knock control by supplying an antiknock agent is mechanically and chemically executed and thus there is a certain delay between supply of the antiknock agent and suppression of the knocks.

According to the processing routine of FIG. 3, however, the ignition timing is instantaneously advanced from the basic spark advance angle to MBT at the time $t_1$ after a predetermined time period $T_1$ has elapsed since the time $t_0$, i.e., since the beginning of injection of the antiknock agent, as is shown in FIG. 7(C). Therefore, even if knock control by supplying an antiknock agent involves a delay in the knock control, no knocks occur at the start of supply of the antiknock agent, as is shown in FIG. 7(G).

FIG. 8 illustrates a modification of the processing routine of FIG. 3. The operations at points 80 to 86 in FIG. 8 are the same as those of the corresponding parts in FIG. 3. In the processing routine of FIG. 8, however, the program proceeds from point 86, where the injection-instruction flag is turned on and the antiknock agent is supplied to the engine, to point 100. At point 100, the CPU 54 discriminates whether or not the amount of correction $\Delta\theta$ is $\geq$ f(N). If "NO", the program proceeds to point 101, where the amount of correction $\Delta\theta$ is increased by a predetermined value $\alpha$. Since the step of point 101 is repeated until the amount of correction $\Delta\theta$ becomes equal to or greater than f(N), when supply of the antiknock agent is started, the amount of correction $\Delta\theta$ is gradually increased from zero to f(N). Then the amount of correction $\Delta\theta$ is maintained at f(N). Accordingly, after the time $t_0$, the ignition timing is gradually advanced to MBT, as is shown in FIG. 7(D). As will be apparent from the above explanation, according to the processing routine of FIG. 8, since advance of the ignition timing involves a delay, knocks at the start of supply of the antiknock agent can be completely prevented.

FIG. 9 illustrates another modification of the processing routine of FIG. 3. The operations at points 80 to 86 in FIG. 9 are the same as those of the corresponding parts in FIG. 3. However, in the processing routine of FIG. 9, the program proceeds from point 86, where the injection-instruction flag is turned on, to point 102. At point 102, it is discriminated whether or not a predetermined time period $T_2$ has elapsed since the beginning of injection of the antiknock agent. If "NO", namely, if the predetermined time period $T_2$ has not elapsed, the program proceeds to point 83, if "YES", namely, if the predetermined time period $T_2$ has elapsed, the program proceeds to point 103. The steps of points 103 and 104 are the same as those of points 100 and 101 of FIG. 8 except that the increment value $\beta$ of the amount of correction $\Delta\theta$ during one operation is a predetermined value which is greater than $\alpha$ ($\beta > \alpha$). According to the processing routine of FIG. 9, the ignition timing is maintained at the basic spark advance angle for the time period $T_2$ from the time $t_0$ to the time $t_2$ and thereafter is gradually increased to MBT. The processing routine of FIG. 9 can also suppress knocks at the start of supply of the antiknock agent.

According to the present invention, as was explained in detail in the foregoing, the ignition timing is not fixed at MBT simultaneous with the start of supply of the antiknock agent; rather, it is fixed at MBT after a certain time has elapsed since the start of supply of the antiknock agent. Therefore, loud knocks at the start of supply of the antiknock agent can be completely suppressed.

In the aforementioned embodiment, whether or not the operating condition of the engine is in the knock-development range is discriminated by the rotational speed and the throttle opening degree. However, as is apparent, the operating condition of the engine can be discriminated by the rotational speed and the intake manifold pressure.

As many widely different embodiments of the present invention may be constructed without departing from the spirit and scope of the present invention, it should be understood that the present invention is not limited to the specific embodiments described in this specification, except as defined in the appended claims.

I claim:

1. A knock control method for an internal-combustion engine, comprising the steps of:
   detecting the operating condition of the engine to produce at least one engine parameter signal which is indicative of the detected operating condition;
   in response to said engine parameter signal, discriminating whether the operating condition of the engine is in a predetermined knock-development range wherein the engine has a greater tendency to knock;
   if it is determined that the operating condition of the engine is in said predetermined knock-development range, supplying an antiknock agent to the engine; and
   after supplying the antiknock agent to the engine, advancing the ignition timing a predetermined time after the start of supplying the antiknock agent.

2. A knock control method as claimed in claim 1, wherein said advancing step includes the step of advancing the ignition timing to a crank angle where the best torque can be obtained after a predetermined time has elapsed subsequent to the start of supplying the antiknock agent.

3. A knock control method as claimed in claim 2, wherein said advancing step includes the step of instantaneously advancing the ignition timing to a crank angle where the best torque can be obtained after a predetermined time has elapsed subsequent to the start of supplying the antiknock agent.

4. A knock control method as claimed in claim 2, wherein said advancing step includes the step of gradually advancing the ignition timing to a crank angle where the best torque can be obtained after a predetermined time has elapsed subsequent to the start of supplying the antiknock agent.

5. A knock control method as claimed in claim 1, wherein said step of detecting the operating condition of the engine includes the steps of:
   detecting the rotational speed of the engine to produce a first parameter signal which is indicative of the detected rotational speed; and
   detecting the degree of throttle opening to produce a second engine parameter signal which is indicative of the detected degree of throttle opening.

6. A knock control method as claimed in claim 5, wherein said step of discriminating whether the operating condition of the engine is in said range includes, in response to said first and second engine parameter signals, determining whether the rotational speed of the engine is lower than a predetermined rotational speed and whether the degree of throttle opening is greater than a predetermined degree of throttle opening.

7. A knock control method for an internal-combustion engine, comprising the steps of:
   detecting the operating condition of the engine to produce at least one engine parameter signal which is indicative of the detected operating condition;
   in response to said engine parameter signal, discriminating whether the operating condition of the engine is in a predetermined knock-development range wherein the engine has a greater tendency to knock;
   if it is determined that the operating condition of the engine is in said predetermined knock-development range, supplying an antiknock agent to the engine; and
   gradually advancing the ignition timing to a crank angle where the best torque can be obtained once the antiknock agent is supplied to the engine.

8. A knock control method as claimed in claim 7, wherein said step of detecting the operating condition of the engine includes the steps of:
   detecting the rotational speed of the engine to produce a first engine parameter signal which is indicative of the detected rotational speed; and
   detecting the degree of throttle opening to produce a second engine parameter which is indicative of the detected degree of throttle opening.

9. A knock control method as claimed in claim 8, wherein said step of discriminating whether the operating condition of the engine is in said range includes, in response to said first and second engine parameter signals, determining whether the rotational speed of the engine is lower than a predetermined rotational speed and whether the degree of throttle opening is greater than a predetermined degree of throttle opening.

10. A knock control apparatus for an internal-combustion engine, comprising:
    means for detecting the operating condition of the engine to produce at least one engine parameter signal which is indicative of the detected operating condition;
    means responsive to said engine parameter signal for discriminating whether the operating condition of the engine is in a predetermined knock-development range wherein the engine has a greater tendency to knock;
    means for supplying an antiknock agent to the engine if it is determined that the operating condition of the engine is in said predetermined knock-development range; and
    means for advancing the ignition timing after a predetermined time has elapsed subsequent to the start of supplying the antiknock agent.

11. A knock control apparatus as claimed in claim 10, wherein said advancing means includes means for advancing the ignition timing to a crank angle where the best torque can be obtained after a predetermined time has elapsed subsequent to the start of supplying the antiknock agent.

12. A knock control apparatus as claimed in claim 11, wherein said advancing means includes means for instantaneously advancing the ignition timing to a crank angle where the best torque can be obtained after a predetermined time has elapsed subsequent to the start of supplying the antiknock agent.

13. A knock control apparatus as claimed in claim 11, wherein said advancing means includes means for gradually advancing the ignition timing to a crank angle where the best torque can be obtained after a predetermined time has elapsed subsequent to the start of supplying the antiknock agent.

14. A knock control apparatus as claimed in claim 10, wherein said operating condition detecting means includes:

means for detecting the rotational speed of the engine to produce a first engine parameter signal which is indicative of the rotational speed; and means for detecting the degree of throttle opening to produce a second engine parameter signal which is indicative of the detected degree of throttle opening.

15. A knock control apparatus as claimed in claim 14, wherein said discriminating means includes means responsive to said first and second engine parameter signals for determining whether the rotational speed of the engine is lower than a predetermined rotational speed and whether the degree of throttle opening is greater than a predetermined degree of throttle opening.

* * * * *